United States Patent
Donadon (10) Patent No.: US 12,222,010 B2
(45) Date of Patent: Feb. 11, 2025

(54) JUNCTION DEVICE FOR CONNECTING AN ADAPTER TO A FLANGE FOR MOTION TRANSMISSION FROM A MOTOR TO ONE OR MORE ROLLING ROLLS

(71) Applicant: DANIELI & C. OFFICINE MECCANICHE S.p.A., Buttrio (IT)

(72) Inventor: Andrea Donadon, Udine (IT)

(73) Assignee: DANIELI & C. OFFICINE MECCANICHE S.p.A., Buttrio (IT)

( * ) Notice: Subject to any disclaimer, the term of this patent is extended or adjusted under 35 U.S.C. 154(b) by 437 days.

(21) Appl. No.: 17/753,352

(22) PCT Filed: Sep. 3, 2020

(86) PCT No.: PCT/IB2020/058190
§ 371 (c)(1),
(2) Date: Feb. 28, 2022

(87) PCT Pub. No.: WO2021/044323
PCT Pub. Date: Mar. 11, 2021

(65) Prior Publication Data
US 2022/0307557 A1    Sep. 29, 2022

(30) Foreign Application Priority Data
Sep. 5, 2019    (IT) .................. 202019000002993

(51) Int. Cl.
*F16D 3/50*     (2006.01)
*B21B 35/14*    (2006.01)
*F16D 3/26*     (2006.01)

(52) U.S. Cl.
CPC ............... *F16D 3/50* (2013.01); *B21B 35/14* (2013.01); *F16D 3/265* (2013.01); *Y10T 403/7003* (2015.01)

(58) Field of Classification Search
CPC . F16D 3/50; F16D 3/265; B21B 35/14; Y10T 403/7003
(Continued)

(56) References Cited

U.S. PATENT DOCUMENTS 3,229,481 A * 1/1966 Dunn ............... F16D 3/265
464/110
4,274,268 A * 6/1981 Taig ............... F16D 3/265
464/110
(Continued)

FOREIGN PATENT DOCUMENTS

| CN | 102808863 A | 12/2012 |
| EP | 2772332 A1 | 9/2014 |
| KR | 20050091618 A | 9/2005 |

OTHER PUBLICATIONS

Patent Cooperation Treaty, International Search Report and Written Opinion for International Application No. PCT/IB2020/058190, mailed Jan. 20, 2021, 11 pages.

*Primary Examiner* — Greg Binda
(74) *Attorney, Agent, or Firm* — Stetina Brunda Garred & Brucker (57) ABSTRACT

An elastic junction device for the dynamic connection, in a rolling mill, between the motor side and the head of an adapter or between the adapter and one or more rolling rolls comprises a central body which can be connected to an end of said flange so that it can rotate integrally therewith. The device additionally comprises two skids through a connecting pin so that said block rotates integrally with said flange, said skids being mechanically couplable to said adapter to allow the rotation thereof upon the rotation of said flange and vice versa. The junction device comprises at least a first damper element and at least a second damper element housed in the block and which act on opposite parts of the connecting pin so as to absorb the axial tensions which are
(Continued)

transmitted along the adapter as a result of the stresses caused by rolling.

10 Claims, 4 Drawing Sheets

(58) Field of Classification Search
USPC .......................................................... 464/110
See application file for complete search history.

(56) References Cited

U.S. PATENT DOCUMENTS

| | | |
|---|---|---|
| 7,582,019 B2 | 9/2009 | Berger et al. |
| 7,784,380 B2 | 8/2010 | Berger et al. |
| 9,486,846 B2 * | 11/2016 | Donadon .............. B21B 35/142 |

* cited by examiner

JUNCTION DEVICE FOR CONNECTING AN ADAPTER TO A FLANGE FOR MOTION TRANSMISSION FROM A MOTOR TO ONE OR MORE ROLLING ROLLS

CROSS-REFERENCE TO RELATED APPLICATIONS

This application claims priority to PCT International Application No. PCT/IB2020/058190 filed on Sep. 3, 2020, which application claims priority to Italian Patent Application No. 202019000002993 filed on Sep. 5, 2019, the disclosures of which are expressly incorporated herein by reference.

STATEMENT RE: FEDERALLY SPONSORED RESEARCH/DEVELOPMENT

Not applicable.

BACKGROUND OF THE INVENTION

Field of the Invention

The present invention relates to a load-damping system applicable to an adapter which can be used to transmit the motion generated by a motor to one or more rolling rolls. More specifically, the present invention relates to a junction device for the dynamic connection between the motor side and the head of an adapter or between the adapter and one or more rolls of a rolling mill stand. The junction device according to the present invention allows the reduction of the axial tensions which are transmitted along the adapter as a result of the stresses arising during the rolling operation.

Background Art

Two types of adapters are known from the prior art: fixed adapters and telescopic adapters. The formers form a rigid body, while the latter can vary their axial extension. In the case of a rolling mill, this second solution allows the shifting of the rolls or rolling cylinders. Disadvantageously, both types of adapters, and in particular the fixed adapters, transmit the axial component of the load generated during the rolling operation to the motor. Indeed, the rolling mill stand, for example, can generate axial loads due to various phenomena related to the rolling process, which can be transmitted through the adapters from the rolling cylinders to the motor. The ends of the working rolls of the mill stand, on the side opposite to that of the adapters, are housed in a chock. Between the chock and the respective fixed shoulder there is a predetermined clearance, which by design normally has a nominal value of about 1 mm, while it can actually also reach 3-4 mm, being the result of a sum of tolerances and also due to possible wear which may occur over time.

The thrust bearings of the motors generally have an axial clearance limited to +0.35 mm for reasons of intrinsic functioning of the motors which, therefore, can be still affected by the axial loads generated by the rolling stand since the axial clearance between chocks and shoulders is greater than that of the thrust bearing of the motor.

Thus, the axial forces which arise during the rolling operation close such a clearance, and such forces are then transmitted to the motors through the adapters. These loads are harmful for the motors which, precisely to oppose such stresses, are normally provided with radial or axial thrust bearings suitably sized according to the maximum load since any failure of said bearings would result into the motor bring put out of order.

In plants having this size and these features, such as rolling plants, the main motors are absolutely vital for production, and therefore it is essential to prevent failure of these members, which could lead to a shutdown of months also because often spare parts are not available in a short time for components of this type and size (these are motors with a power capable of reaching up to 10,000 kW). A plant shutdown is obviously the most negative factor which a manufacturer can experience because it implies loss of productivity. Therefore, to prevent this from occurring, it is preferred to oversize the axial bearing of the motor, even if this implies a substantial increase in the size of the total expenditure; both radial and axial motor bearings are very expensive and their size consistently impacts the total cost of motors. In the prior art, the junctions between the skid adapters and the flanges on roll side or motor side essentially consist of axially rigid systems which, due to such a rigidity, transmit all the loads from the rolling stand to the motor. In other words, the adapter junctions are generally obtained by rigidly constraining the constituent parts.

A first example of a system of this type is provided by document U.S. Pat. No. 7,582,019B2 in which two sections of an adapter are interconnected through a system of compensation of the axial loads which provides for the use of longitudinal cylindrical dampers arranged both within the connection itself and outside it. The inner cylinders consist of a guiding jacket within which a sliding damper element can move, the rectilinear motion of which takes place along the longitudinal axis of the adapter. This frictional non-rotatable connection is coupled to the outer cylindrical dampers which absorb the axial forces and prevent the twisting of the two interconnected segments of the adapter. Thereby, however, this double connection exhibits a rigidity which prevents the effective absorption of the transverse and torsion stresses normally affecting the normal operation of the adapters. This gives the system a lack of elasticity precisely where the greatest stresses coming from the rolling system arise.

A second axially rigid interconnection system is described in document U.S. Pat. No. 7,784,380. The system provides the use of an interconnection between a flange and the head of an adapter consisting of a housing block rigidly fixed to the end of the adapter and within which a pressure bar is longitudinally arranged. The orientation and the shape of the bar are aimed to withstand and balance the axial thrust and traction loads, while its angular movement is limited by the design degree of freedom of the housing block. This solution is therefore also affected by the transverse rigidity and torsion rigidity which do not allow the elastic absorption of all the tensions and stresses to which the adapter head is subjected.

In both cases described above, as in every other solution currently adopted in the prior art, a component which is essential for the effective reduction of the loads transmitted to the adapter is therefore lacking, i.e. the elastic and multi-directional response to such loads, which may effectively reduce any risk for the integrity of the connecting junctions and, in particular, of the motors.

SUMMARY OF THE INVENTION

It is the object of the present invention to provide an elastic junction for skid adapters which effectively allows to compensate and absorb the forces transmitted by the rolling system to the motors.

It is a further object of the present invention to provide a junction for skid adapters which allows only a given pre-defined maximum force to be axially transmitted to the motors.

It is another object of the present invention to provide a junction for skid adapters which allows to use a smaller axial bearing compared to those currently adopted.

It is a not last object of the present invention to provide a junction for adapters which is reliable and easy to manu-facture at competitive costs.

The present invention thus relates to a junction device for connecting an adapter to a flange in a rolling mill. In particular, the junction device comprises:
- a block which can be connected to the flange so as to rotate integrally therewith about a first rotation axis;
- a pair of skids arranged on opposite sides of the block and connected to the same block through a connecting pin, wherein such a pin crosses the block so that, upon the connection of the block to the flange, the longitudinal axis of the pin is orthogonal to the first axis; the connecting pin making the skids integral with the block during the rotation about the first axis.

According to the present invention, the skids comprise a mechanical coupling surface which is geometrically com-pliant with a coupling surface of the adapter, so that, upon the mechanical coupling between said surfaces the rotation motion of the flange is transferred to the adapter or vice versa. Furthermore, the coupling surface is configured to allow relative rotation of the adapter with respect to the block and the skids about a further axis orthogonal to a plane identified by the first rotation axis of the flange and by the longitudinal axis of the connecting pin.

According to the present invention, the junction device further comprises at least a first damper element and at least a second damper element housed in the block and arranged on opposite sides of the pin in a position opposite to a reference plane on which the longitudinal axis of the pin lies and which is orthogonal to the first rotation axis.

The dependent claims describe preferred embodiments of the present invention.

BRIEF DESCRIPTION OF THE FIGURES

Further features and advantages of the present invention will become more apparent in light of the detailed descrip-tion of a preferred, but not exclusive, embodiment of a junction device for connecting an adapter to a flange dis-closed by way of non-limiting example, with the aid of the accompanying drawings, in which:

FIG. 1b is a cross-section view taken along plane A-A of the junction device in FIG. 1a;

FIG. 1c is an exploded view of two components of the junction device in FIG. 1a;

DETAILED DESCRIPTION

With reference to the aforementioned figures, the present invention relates to a junction device 1 for connecting a flange 2 to an adapter 3, wherein such components (flange and adapter) can be used in a motion transmission system 150 from a motor M to one or more rolls R of a rolling mill stand. The flange 2 may be connected to the motor M or the rolls R. Therefore, the junction device 1 according to the present invention may be used to connect the adapter 3 on "motor side" (i.e. to connect the adapter 3 to the flange 2 associated with the motor M) or on "mill stand side" (i.e. to connect the adapter 3 to the flange 2A associated with the rolls R-see FIG. 2).

Figure 1A:
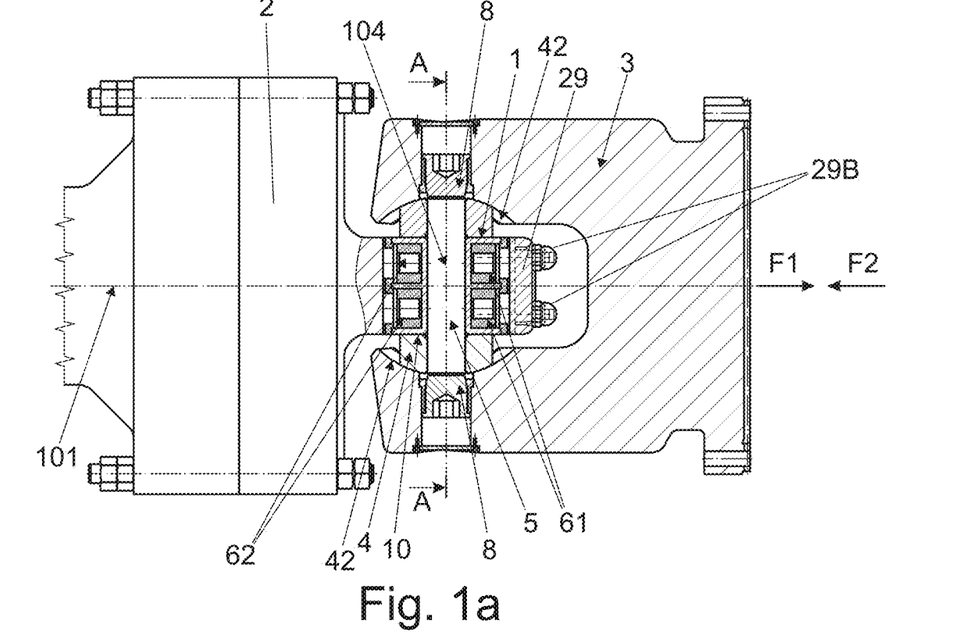
FIG. 1a is a longitudinal section view of a junction device according to the present invention.

FIG. 1a shows a possible embodiment of a junction device 1 according to the present invention which comprises a block 10 connected to the flange 2 so that it can rotate integrally therewith about a first rotation axis 101. Accord-ing to a preferred embodiment depicted in the figures, the block 10 is placed in a defined seat 28 through one end of the flange 2 (see FIG. 1c).

The junction device 1 comprises a pair of skids 4A,4B on opposite sides of the block 10. In particular, a first skid 4A is arranged in a position adjacent to a first side 12A of the block 10, while a second skid 4B is placed in a position adjacent to a second side 12B of the block 10 so that it is opposite to the first skid 4A with respect to the block 10. Preferably, each of the two skids 4A, 4B is in contact with the corresponding side of 12A, 12B to which it is adjacent.

The skids 4A, 4B have substantially the same configura-tion and are connected to the block 10 by a connecting pin 5 which crosses the block itself and at least partially the two skids 4A, 4B. In particular, the pin 5 is arranged so that its longitudinal axis 104 is orthogonal to the first rotation axis 101 once the block 10 is connected to the flange 2. There-fore, the pin 5 makes the skids 4A, 4B integral to block 10. Thereby, the rotation of the block 10, determined by the rotation of the flange 2, results in a rotation of the two skids 4A, 4B about the first axis 101.

Each of the skids 4A, 4B comprises a mechanical cou-pling surface 41 with the adapter 3. In particular, for each skid 4A, 4B, said coupling surface 41 is geometrically compliant with a corresponding coupling surface 42 of the adapter 3. Upon the mechanical coupling of such surfaces 41, 42, the two skids 4A, 4B transmit the torque from the flange 2 to the adapter 3, in case the flange 2 is arranged on the motor side, or from the adapter 3 to the flange 2, in case the flange 2 is on the mill stand side (rolls R). In any case, the adapter 3 is free to rotate about a second rotation axis 102 (hereinafter also referred to as the longitudinal axis 102 of the adapter 3).

Figure 1B:
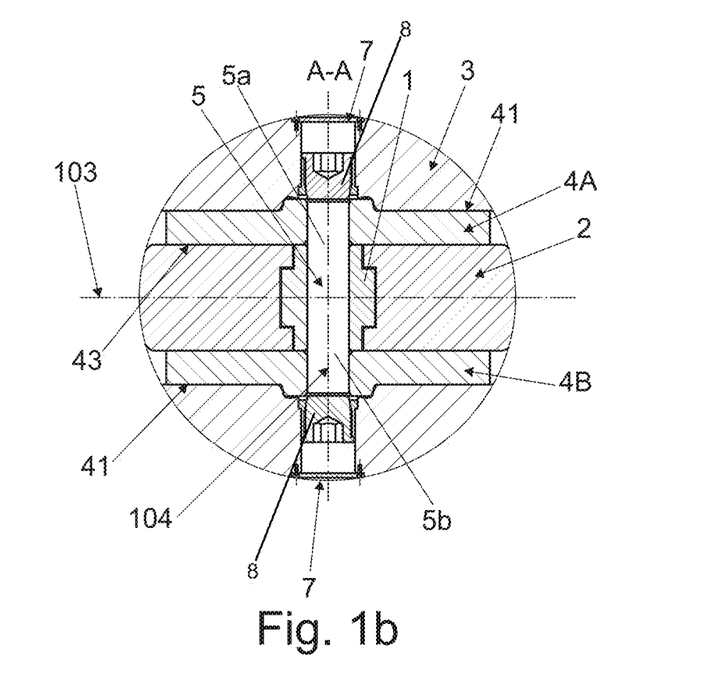

The coupling surfaces 41 of the skids 4A, 4B are further configured to allow, upon the coupling to the adapter 3, a relative rotation of the latter about a third rotation axis 103 (shown in FIG. 1b) orthogonal to a plane identified by the first rotation axis 101 and the longitudinal axis 104 of the pin 5. This further degree of freedom in rotation allows an offset between the first axis 101 and the second rotation axis 102, i.e. it allows the rotation axis of the flange 2 to be inclined with respect to the longitudinal axis 102 of the adapter 3 (see in particular FIG. 2).

The junction device 1 according to the present invention further comprises at least a first damper element 61 and at least a second damper element 62 housed, at least partially, inside the body of the block 10 on the opposite side with respect to the pin 5 which crosses the block itself to connect the two skid 4A, 4B. More precisely, the two damper elements 61, 62 are arranged on opposite sides, preferably in a mirroring position, with respect to a reference plane containing the longitudinal axis 104 of the pin 5 and orthogonal with the first axis 101 of the flange 2. As a result of the axial loads to which the adapter 3 is subjected, the damper elements 61, 62 act on the pin 5 from the opposite sides allowing relative displacements of the pin 5 (and consequently of the block 10 and the skids 4A, 4B) with respect to the flange 2. Indeed, the damper elements 61, 62 are operationally interposed between the flange 2 and the pin 5 and are either compressed or extended according to the direction of the axial load on the adapter 3.

According to a preferred embodiment, depicted in FIG. 1a, the junction device 1 comprises a first plurality of damper elements 61 and a second plurality of damper elements 62. Both pluralities of damper elements 61, 62 are arranged within the block 10 so as to act on the pin 5 from opposite sides. Preferably, each damper element 61 of said first plurality mirrors a corresponding damper element 62 of said second plurality, with respect to the aforesaid reference plane identified by the axes 104 and 101.

In general, the damper elements 61, 62 may be of different types and chosen from those already known. Preferably, the damper elements 61,62 may be spring packs, hydraulic dampers, or a combination thereof. Hereinafter, for descriptive purposes only, the damper elements 61,62 are also referred to as spring packs 61,62, but it is understood that they may have a different shape.

With reference again to FIG. 1a, the axial forces (indicated by F1), e.g. determined by the rolling cylinders, are transmitted to the adapter 3 and then to the block 10 through the skid 4A, 4B mechanically connected to the adapter 3. The spring packs 62 inside the block 1 arranged on a first side of the pin 5 are then compressed between the flange 2 and the pin 5, and the spring packs 61 on the opposite side are extended accordingly. Therefore, by effect of the spring packs 61, 62, the flange 2 may remain stationary despite the translation of the adapter 3, of the pin 5 and of the skids 4A, 4B, determined by the axial loads F1. The advantageous arrangement of the damper elements 61, 62 on the opposite sides of the pin 5 makes the device bidirectional, i.e. it operates both in case of pulling forces (arrow F1) and pushing forces (arrow F2) on the adapter 3.

Figure 1C:
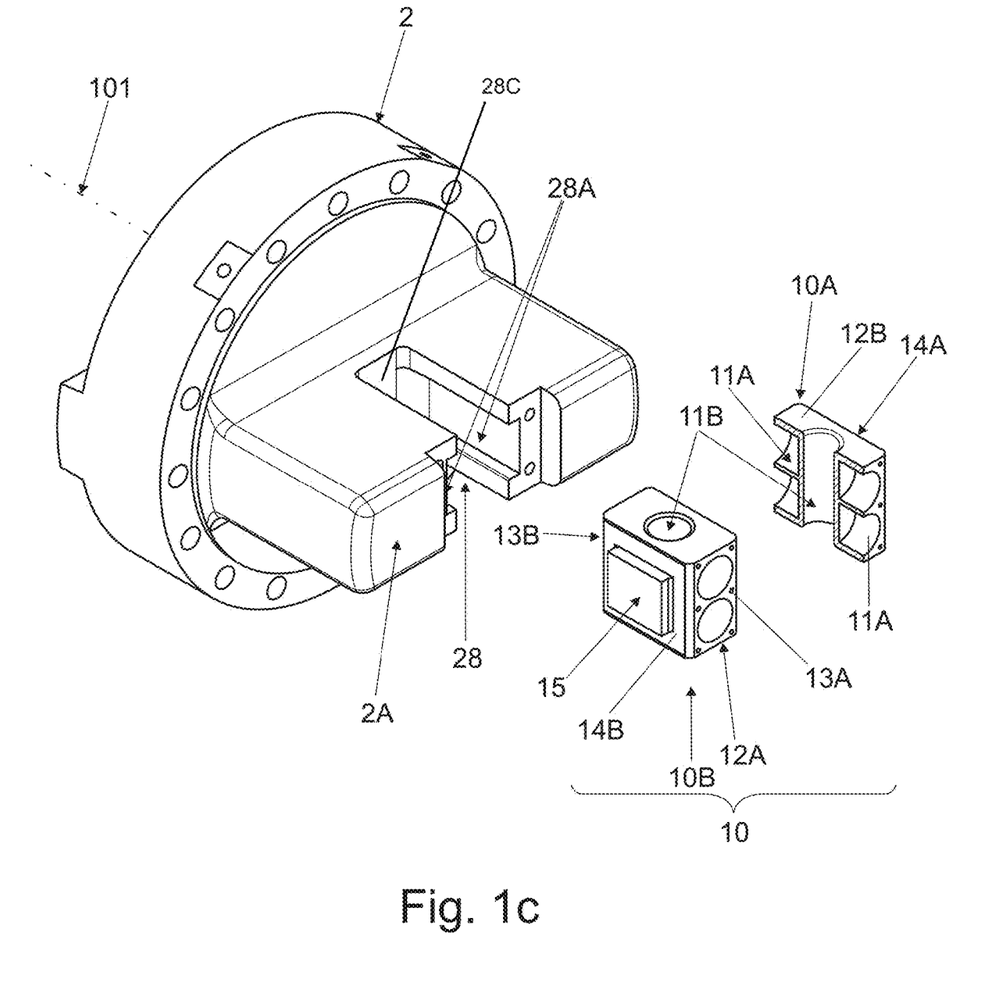

FIG. 1c shows a possible embodiment of the block 10 and of how it can be connected to the flange 2. The block 10 comprises a first body 10A in which a second body 10B is inserted. The two bodies 10A, 10B are configured to define, upon the insertion of one into the other, a plurality of housings 11A for the damper elements 61, 62 and at least one housing 11B for the passage of the pin 5 which connects the block 10 to the skids 4A, 4B. As a whole, the block 10 preferably has a prismatic shape, in which a first pair of opposite sides 12A, 12B from each of which a terminal part 5A, 5B of the pin 5 can be identified. Each terminal part 5A, 5B is integrally connected to a corresponding skid 4A, 4B.

In this embodiment, a second pair of opposite sides 13A, 13B are identified for the block 10 from which the ends of the damper elements 61, 62 and a third pair of opposite sides 14A, 14B, comprising a connection part 15 to connect the block 10 to the flange 2, protrude.

In this regard, according to a preferred embodiment also depicted in FIG. 1c, the flange 2 defines a seat 28 in which the block 10 can be inserted through a straight movement along a direction parallel to the first rotation axis 101 of the flange 2. More precisely, the seat 28 defines two opposite guides 28A within each of which the connection part 15 defined on a corresponding side of said third pair of sides 14A, 14B of the block 10 can slide. As a whole, the guides 28A and the connection parts 15 configure two "male-female" type couplings between the block 10 and the flange 2. Once the block 10 has been inserted into seat 28, the inlet of the latter is closed through a retainer element 29 (depicted in FIG. 1a). Thereby, the block 10 remains permanently inside the seat 28. Preferably, the retainer element 29 is connected to the flange 2 through removable connection means, such as the screws 29B depicted in FIG. 1a.

As indicated above, as a result of a force induced on the adapter 3, the skids 4A, 4B constrained to the pin 5, and consequently the block 10, move axially with respect to the flange 2 along the direction defined by the guides 28A of the seat 28. However, for this relative movement to take place, the axial loads (F1-F2) must exceed the friction forces which arise between the components constrained to the skids 4A,4B, and the flange 2 as a result of the torque transmitted from the flange 2 to the adapter 3 via the skids 4A,4B. Thereby, the junction 1 is only activated when the need arise, i.e. the damper elements 61, 62 only come into play when the loads exceed the friction forces between the flange 2 and the skids 4A, 4B. It is worth noting that the damper elements 61 are interposed between the retainer element 29 and the pin 5, while the damper elements 62 are interposed between the pin 5 and the bottom 28C of the seat 28 defined on the flange 2. Therefore, upon the movement of the block 10 towards the retainer element 29, the damper elements 61 are compressed between the pin 5 and the same retainer element 29, while the damper elements 62 remain either unloaded or are stretched. In an entirely similar manner, when the block 10 moves towards the bottom 28C of the seat 28, the damper elements 62 are compressed, while the damper elements 61 are either stretched or otherwise not compressed.

With reference to FIG. 1a, according to a preferred embodiment, the skids 4A, 4B are free to rotate, with respect to the block 10, about the longitudinal axis 104 of the pin 5. In other words, in this embodiment, the skids 4A, 4B are constrained to the pin 5 and the block 10 in the translation movement parallel to the first rotation axis 101 of the flange 2 but maintain a rotation freedom degree with respect to the block 10 about the axis 104 of the pin 5. Therefore, the adapter 3 is also constrained to the skids 4A,4B which can rotate about the pin 5. The device allows two possible rotational movements, which can be implemented either separately or in combination, to offset the axis 102 of the adapter 3 with respect to the axis 101 of the flange 2.

Figure 2:
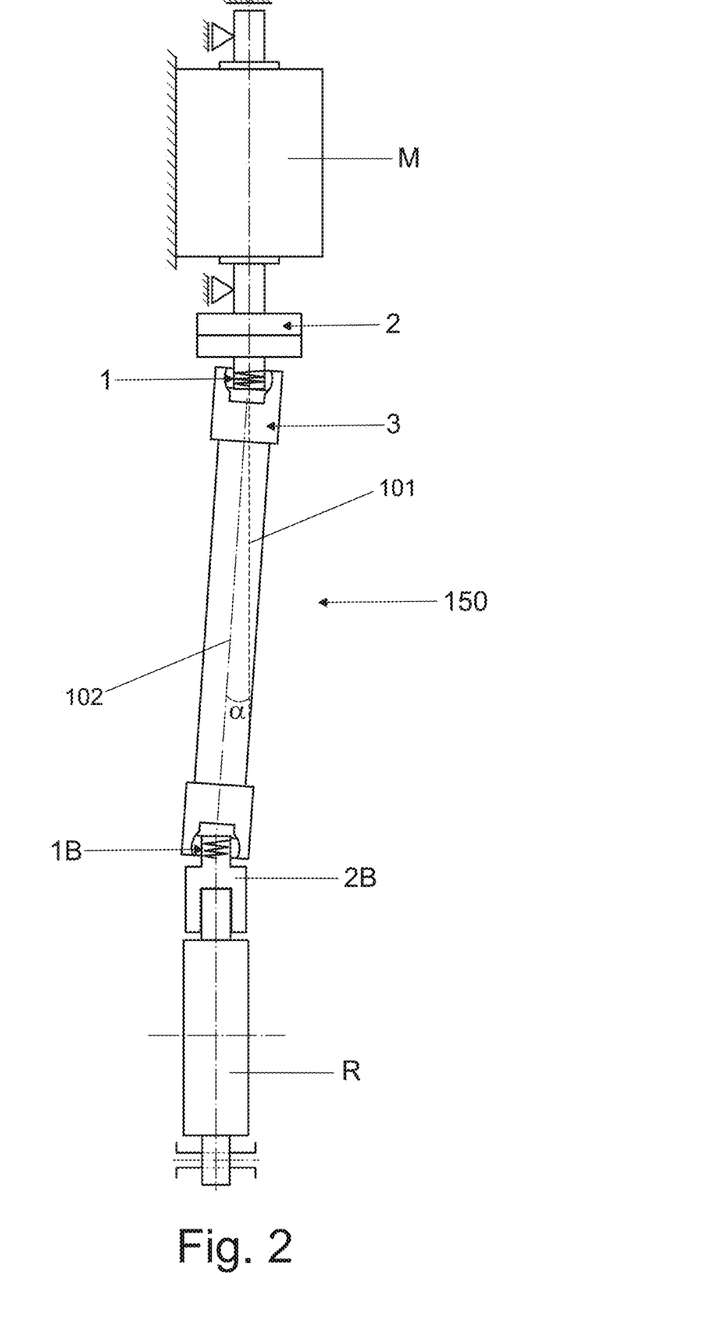
FIG. 2 is a view of a junction according to the present invention, applied on skid adapters of a rolling mill.
Figure 3:
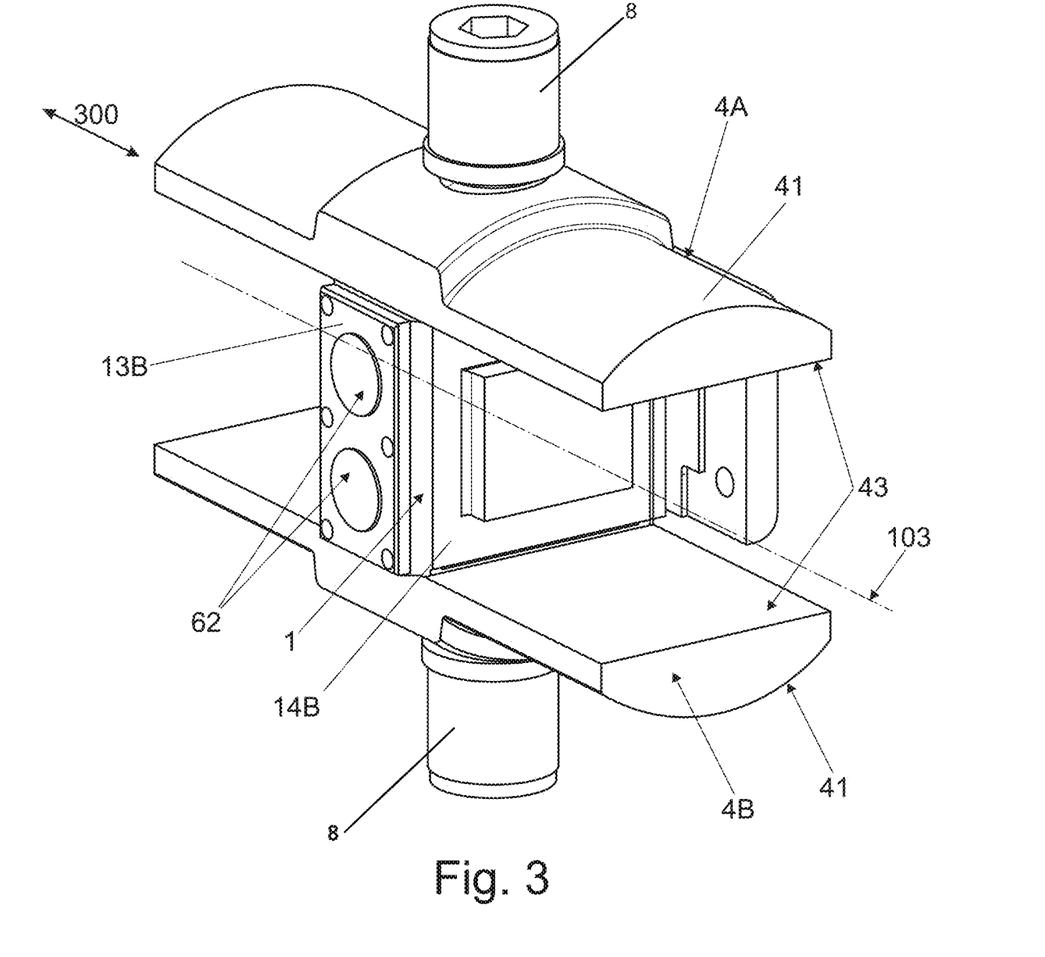
FIG. 3 is a perspective view of some components of the junction device according to the present invention, and of some components for connecting the junction device to an adapter. The same reference numbers in the figures identify the same members.

According to a preferred embodiment depicted in FIG. 3, the coupling surface 41 of the skids 4A, 4B is shaped as part of the lateral surface of a cylinder. Again with reference to FIG. 3, the skids 4A, 4B develop along a longitudinal direction 300 parallel to the third rotation axis 103, defined above. Each of the two skids 4A, 4B further comprises an inner surface 43 (opposite the corresponding coupling surface 41) which remains adjacent to the corresponding side 14A, 14B of the block 10. The inner surface 43 is substantially flat to rest on a corresponding flat surface of the flange 2, as shown in FIG. 2. Each skid 4A, 4B has a hole between the coupling surface 41 and the inner surface 43 to house a corresponding terminal part 5A, 5B of the connecting pin 5.

The present invention further relates to a motion transmission system 150 which can be used in a rolling mill and comprises at least one elastic junction with the technical features described above. In particular, the system comprises at least one motor M and at least one adapter 3 for transmitting the motion of said motor M to at least one roll R of a rolling mill stand, wherein said system comprises a first flange 2 connected to said motor M and a second flange 2B connected to said roll R. The system comprises at least one connecting junction 1 according to the present invention which connects one of said flanges 2, 2B to said adapter 3. In the embodiment depicted in FIG. 2, the transmission system comprises a first elastic junction 1 to connect the adapter 3 on the motor side and a second elastic junction 1B to connect the adapter on the mill stand side.

In the embodiment depicted in FIG. 2, the rotation axis 102 of the adapter 3 is inclined with respect to the longitudinal axis of the flange 2, 2B by an angle α which can be between 0 and 15 degrees. This inclination is permitted by the degrees of freedom granted to the adapter 3 (rotation about the third axis 103 and/or rotation about the longitudinal axis 104 of the pin) by the conformation of the elastic junction. In particular, any axial, transverse or angular torsional load is effectively counterbalanced by the elastic junction without damaging the motor and/or mill stand side.

In an alternative embodiment of the transmission system, the adapter 3 could be arranged so that its rotation axis 102 is aligned with the rotation axis of the flange 2.

The attached Figures also allow an understanding of how, according to a preferred embodiment, the junction device is installed in accordance with the present invention. In particular, the block 10 is inserted into the seat 28 through the straight guides 28A and without the connecting pin 5. Once the block 10 is inserted, the retainer element 29 is applied so as to prevent the block 10 from escaping. The adapter 3 is then moved to the block 10 and the two skids 4A, 4B are coupled to the adapter 3 on opposite sides of the block 10. At this point, the connection pin 5 is inserted into the appropriate seats defined through each the skid 4A, 4B, and through the block 10. In particular, the pin 5 is positioned by utilizing an appropriate hole 7 which substantially defines the position of the longitudinal axis 104 of the pin 5. Once the pin is inserted, the hole 7 can be obstructed through a plug 8 inserted therein. If the hole diametrically crosses the entire adapter 3 (as in FIG. 1a), then two plugs 8 opposite to the pin 5, and in any case separated therefrom, can be provided.

The described technical solutions allow to fully achieve the predetermined tasks and objects. In particular, with the aid of the junction device of the present invention, the loads applied on the adapters are not transmitted to the motor as a whole. Indeed, it has been seen that they can be reduced by more than 50% compared to the previously adopted solutions until they are almost completely eliminated.

The invention claimed is:

1. A junction device for connecting an adapter to a flange which can be used in a rolling mill, wherein said junction device comprises:
   a block which can be connected to said flange so as to rotate integrally therewith about a first rotation axis;
   a pair of skids arranged on opposite sides of said block and connected to the same block through a connecting pin, wherein said pin crosses said block and at least partially said skids so that, upon the connection of said block to said flange, the longitudinal axis of said pin is orthogonal to said first rotation axis, said pin making said skids integral with said block during the rotation about said first rotation axis;
   at least a first damper element and at least a second damper element housed in said block and arranged on opposite sides of said pin in a position opposite to a reference plane on which said longitudinal axis of said pin lies and which is orthogonal to said first rotation axis;
   wherein each of said skids comprises a mechanical coupling surface which is geometrically compliant with a coupling surface of said adapter, wherein, upon the mechanical coupling of said coupling surfaces of the skids and of said adapter, the rotation motion of said flange is transferred to said adapter or vice versa,
   wherein the coupling surfaces of the skids and said coupling surface of the adapter are configured to allow a relative rotation of said adapter with respect to said block and said skids about a further rotation axis orthogonal to a plane identified by said first rotation axis and by the longitudinal axis of said pin;
   wherein said junction device allows said relative rotation of said adapter with respect to said block and said skids about said further rotation axis; and
   wherein said skids are free to rotate, with respect to the block, about the longitudinal axis of the pin.

2. The junction device according to claim 1, wherein said junction device comprises a first plurality of damper elements and a second plurality of damper elements, wherein said pluralities of damper elements are housed inside said block and arranged on opposite sides with respect to said pin, wherein each damper element of said first plurality of damper elements mirrors a damper element of said second plurality of damper elements with respect to said reference plane.

3. The junction device according to claim 1, wherein said damper elements are spring packs, hydraulic dampers, or a combination thereof.

4. The junction device according to claim 1, wherein said block comprises a first body in which a second body is inserted, said bodies being configured to define, upon the insertion of one into the other, a plurality of housings for said damper elements and at least one seat for the passage of the pin which connects said block to said skids.

5. The junction device according to claim 4, wherein said block has a prismatic shape, wherein a first pair of opposite sides is identified, from which corresponding end parts of said pin emerge, a second pair of opposite sides from which corresponding ends of said damper elements protrude, along with a third pair of opposite sides comprising a connecting part to connect said block to said flange.

6. The junction device according to claim 1, wherein for each of said skids, said coupling surface is shaped as part of the lateral surface of a cylinder, wherein each of said skids develops along a direction parallel to said further rotation direction, and wherein each of said skids comprises a substantially flat inner surface adjacent to a corresponding side of said block, each of said skids having a hole which runs between said coupling surface and said inner surface to house a corresponding end part of said pin.

7. A transmission system which can be used in a rolling mill to transmit the rotational motion generated by a motor to one or more rolls through an adapter, wherein said transmission system comprises at least one flange which connects said motor to said adapter or which connects said one or more rolls to said adapter, said transmission system comprises at least one junction device according to claim 1 to connect said flange to said adapter.

8. The transmission system according to claim 7, wherein said first rotation axis of said flange is substantially aligned to the rotation axis of said adapter.

9. A transmission system according to claim 7, wherein said rotation axis of said adapter is inclined with respect to the first rotation axis of said flange.

10. The transmission system according to claim 7, wherein said flange defines a seat in which said block is inserted, said seat defining two opposing guides in each of which a connecting part can slide, defined on a corresponding side of a pair of opposite sides of said block, said flange comprising a retainer element which retains said block in said seat.

* * * * *